April 2, 1968  E. T. FOLMAR  3,375,775
ELECTRIC BARBECUE MACHINE
Filed Nov. 4, 1966  2 Sheets-Sheet 1
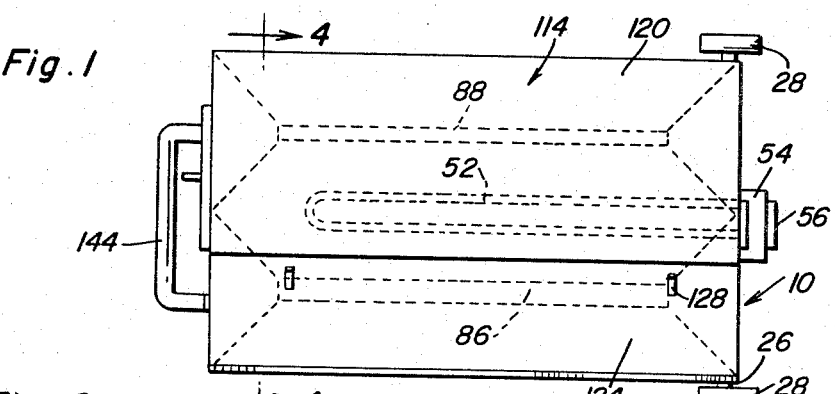
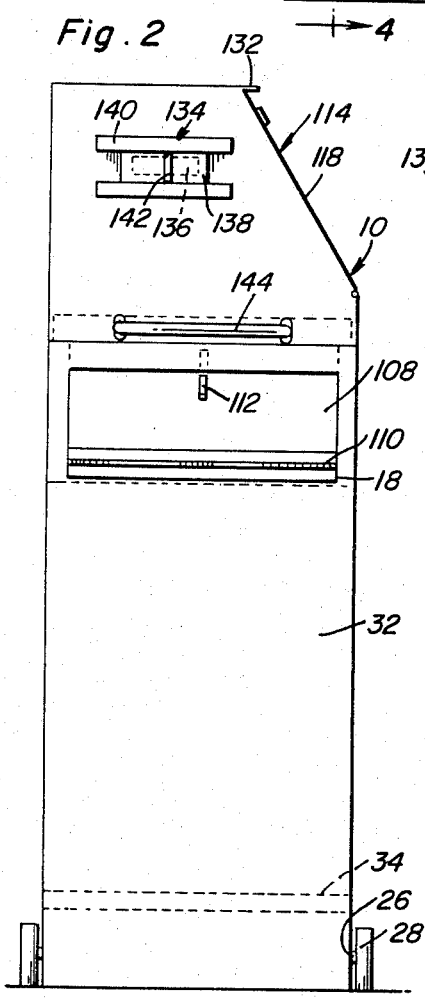
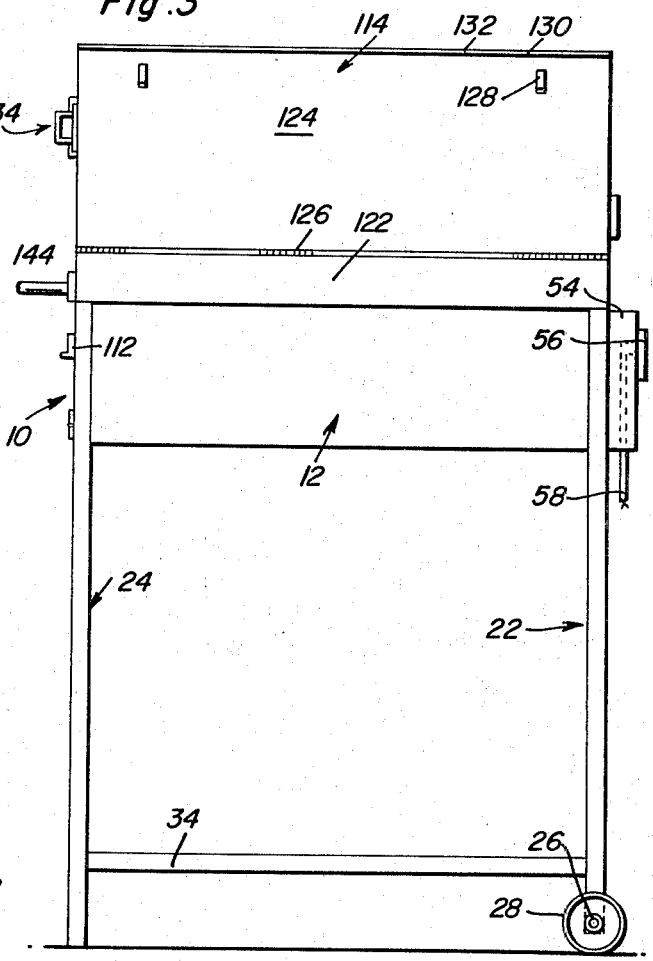
Earl T. Folmar INVENTOR.

April 2, 1968   E. T. FOLMAR   3,375,775
ELECTRIC BARBECUE MACHINE
Filed Nov. 4, 1966   2 Sheets-Sheet 2
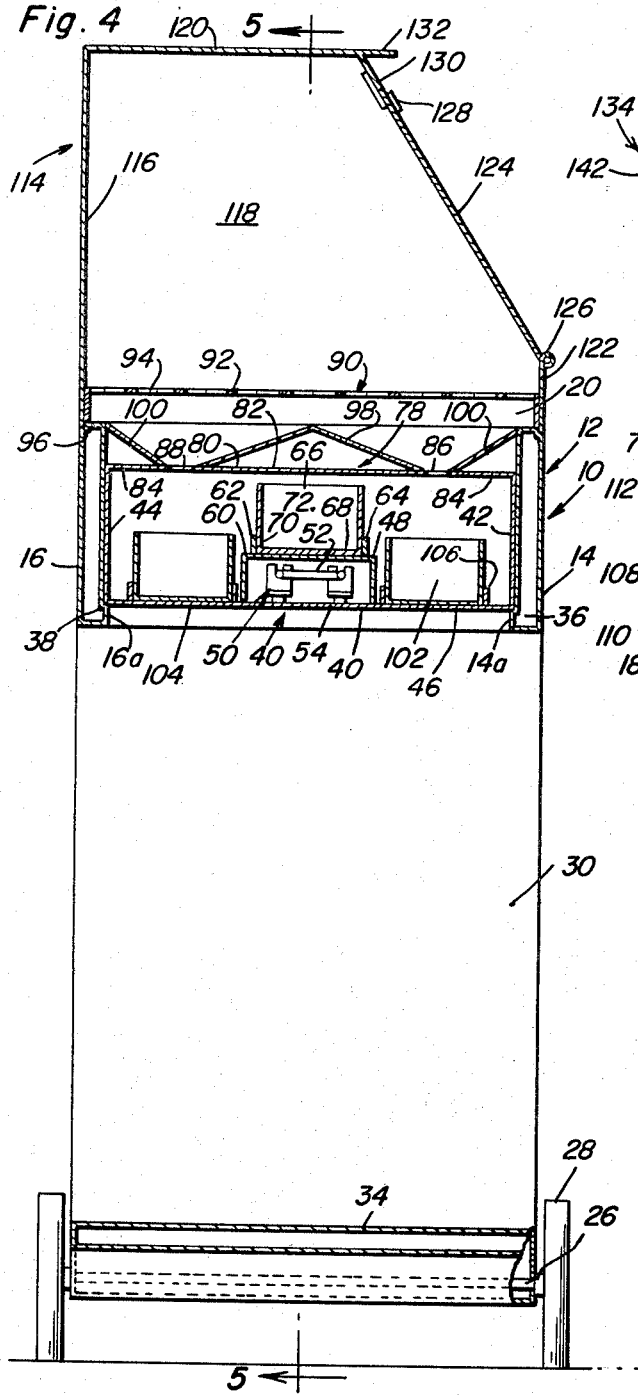
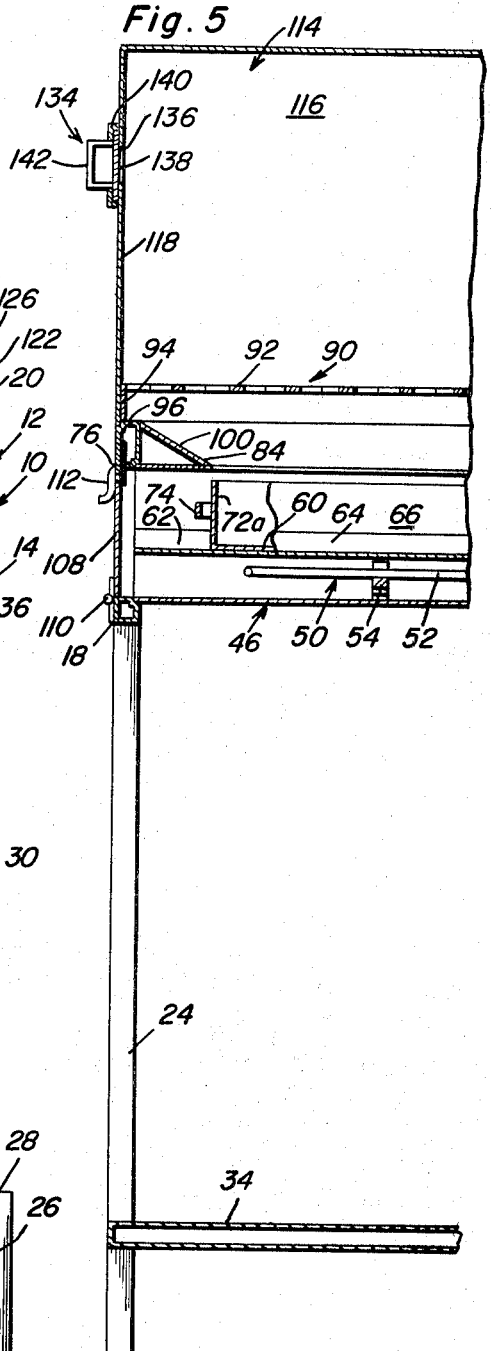
Earl T. Folmar  INVENTOR.

United States Patent Office 3,375,775
Patented Apr. 2, 1968

3,375,775
ELECTRIC BARBECUE MACHINE
Earl T. Folmar, P.O. Box 83, Goshen, Ala. 36035
Filed Nov. 4, 1966, Ser. No. 592,198
12 Claims. (Cl. 99—446)

ABSTRACT OF THE DISCLOSURE

An electric barbecue machine incorporating a tray containing wooden particles which is subjected to the heat generated by an electric heating element. The heat generated by the electric element converts the wooden chips to charcoal which is heated by the same electric element causing the charcoal to burn and cook foodstuffs placed on a grill which is located above the charcoal. Immediately below the grill is positioned a baffle cover containing perforations interiorly situated to allow foodstuff drippings to flow from the baffle cover into receptacle trays located beneath the perforations and housed internally to the barbecue machine.

---

This invention generally appertains to improvements in broiler or barbecue devices for cooking foodstuffs and more particularly relates to a novel electric barbecue machine or apparatus for the barbecuing of foodstuffs, particularly meats.

An important object of the present invention is to provide a barbecue machine or apparatus which will make its own charcoal from wood shavings or pieces or from other organic substances and then utilize the thusly formed charcoal for the barbecuing of foodstuffs, particularly meats.

Another important object of the present invention is to provide an electric barbecue machine which can utilize any type or nature of wood particles and effect combustion of the wood particles to transform the same into charcoal and then to burn the charcoal so as to barbecue foodstuffs with the burning charcoal cooking and flavoring the foodstuffs.

A further important object of the present invention is to provide an extremely compact, inexpensive, efficient and effective electric barbecue machine, which transforms wood particles into charcoal and then burns the charcoal for cooking and flavoring foodstuffs, particularly meats, disposed on a grill means, with the wood particles being disposed in a combustion chamber underlying the grill means and with a baffle means interposed between the combustion chamber and the grill means so that drippings from the foodstuffs cannot come into direct contact with the combustion chamber with means being provided for collecting the drippings.

Another important object of the present invention is to provide a portable electric barbecue machine, which has a frame that supports a combustion chamber in which wood particles are disposed and which supports an electric means, such as a Calrod element, under the combustion chamber and which supports a grill means on which the foodstuffs can be disposed above a baffle means carried by the frame with the baffle means preventing the drippings from the foodstuffs from coming into contact with the combustion chamber but having openings for the directed gravitational flow of the drippings into collection trays disposed alongside the combustion chamber, the combustion chamber and the drippage collection trays being removable from the frame.

Another important object of the present invention is to provide a mobile frame, which is supported in a generally horizontal position by depending legs, certain of which have ground engaging rotatable wheels for the easy transportation of the barbecue machine and with a supporting platform for foodstuffs, cooking implements, flavoring containers and the like being disposed horizontally between the legs and spaced below the frame which carries the removable combustion chamber and the removable drippage collection trays.

A further important object of the present invention is to provide an oven enclosure, which is carried by the frame and which completely encloses the grill means and which is formed with an inwardly and upwardly inclined door to retain condensation inside the oven and which is provided with means for preventing moisture from entering the oven door and which is provided with air vent means.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a top plan view of an electric barbecue machine, constructed in accordance with the present invention;

FIGURE 2 is an end elevational view thereof;

FIGURE 3 is a front side elevational view thereof;

FIGURE 4 is a transverse, vertical cross-sectional view, taken substantially on line 4—4 of FIGURE 1, and, FIGURE 5 is a fragmentary longitudinal, vertical sectional view, taken substantially on line 5—5 of FIGURE 4.

Referring now more particularly to the accompanying drawings, the electric barbecue machine or apparatus, generally designated by the reference numeral 10, includes a frame 12, which is of open rectangular cross-sectional configuration. The frame 12 is composed of longitudinally extending and transversely spaced side walls 14 and 16, which are connected at their opposing ends by channel-type transverse opposing end walls 18 and 20.

The frame 12 is provided at its corners with a forward or front end pair of depending legs 22 and a rear pair of depending legs 24. The lower ends of the legs 22 are spaced slightly above the lower ends of the legs 24 and are provided with a transversely extending axle 26, which supports rotatable ground-engaging wheels 28 on its ends. The lower ends of the legs 24 are adapted to rest directly on the ground in relation to the wheels 28, so that the frame 12 is supported in a generally horizontal position.

Vertically disposed front and rear end panels or walls 30 and 32, respectively, are disposed between and secured to the front legs 22 and the rear legs 24, respectively, as shown in FIGURES 2 and 4. A horizontally disposed platform 34 is positioned between the end panels 30 and 32 and secured also to the legs and is disposed well below the frame 12 with the platform having a flat upper surface and being accessible through the open sides so that foodstuffs, cooking implements, jars and bottles or the like holders for flavoring substances and the like, along with dishes, glasses and the like can be seated or disposed thereon. The inner sides 14a and 16a of the side walls 14 and 16 are formed with shoulders 36 and 38 on which a box-like housing 40 is seated, the side walls 42 and 44 of the housing being suitably fixed to the inner surfaces 14a and 16a of the side walls. The bottom wall 46 of the housing 40 is substantially flat and horizontally disposed and defines a supporting wall secured between the side and end walls of the frame 12.

A housing 48 is formed on the upper surface of the supporting wall 46 and extends longitudinally thereof and is centrally disposed between the side walls of the housing 40 and the side walls 14 and 16 of the frame 12, the housing 48 extending substantially the full length of the frame 12 and constituting an enclosure for an electric heating means 50.

The electric heating means is constituted by a conventional electric heating element 52 mounted in removable fashion on upstanding supports 54. The U-shaped electric heating element 52 as shown in FIGURE 1, extends substantially the full length of the barbecue machine or apparatus and has its leg portions disposed in a housing 54, which is suitably mounted on the end panel 30 and which encloses the flexible electrical conductors which are connected to a heat control unit 56 and to a power supply cable 58, which terminates in any type of conventional connector for attachment to a source of electrical energy.

The top wall 60 of the housing 48 for the electrical heating means 50 is substantially flat and is formed with longitudinally extending and transversely spaced upstanding rails 62 and 64. The top wall supports a combustion chamber 66, which is in the form of an elongated rectangular tray, that has a flat bottom wall 68 and opposing side walls 70 and end walls 72 and which has an open top. The combustion chamber 66 is adapted to house wood particles, such as wood shavings or pieces, whether green or dry, and also to house other organic materials. The wood particles or other materials disposed in the combustion chamber are subject to the heating action of the electric heating element 52 which underlies the combustion chamber and is operative to effect combustion of the wood particles or other material and to transform the same into charcoal and then to burn the charcoal.

The end wall 72a of the combustion chamber, which faces the end wall 18 of the frame 12 is provided exteriorly with a handle 74, so that the combustion tray can be slid on the top wall 60 and removed entirely from the barbecue machine or apparatus 10 through a rather large transverse opening 76 formed in the end wall 18, as shown more particularly in FIGURE 5.

Baffle means 78 fixedly overlies the combustion chamber and includes the top wall 80 of the housing 40, which top wall is substantially flat and parallel with and vertically spaced from the bottom wall 46 of the housing 40. The top wall 80 includes a central imperforate section 82, which completely and directly overlies the combustion chamber 66 and side sections 84; the side section 84 being spaced from the opposing side edges of the center section 82 to establish or create elongated slots 86 and 88.

A grill means 90 is disposed above the baffle means and includes a rectangular grill plate 92, having end and side depending flanges 94, which are removably seated on the upper end edges 96 of the side and end walls of the frame 12 and which removably position the grill plate on the frame means and dispose the same above the top wall portion of the baffle means 78. The top wall portion of the baffle means is defined by a triangular center section 98, that has its apex directly above the combustion chamber and has downwardly and outwardly sloping sides which terminate at the slots 86. The top wall further includes inwardly and downwardly sloped side sections 100, which terminate at their lower ends at the slots 86 and 88.

The purpose of the triangular longitudinally extending central baffle section 98 is to direct drippings from foodstuffs disposed on the grill plate 92 directly and quickly to the slots 86 and 88 and to prevent the same from coming into contact with the combustion chamber 66 and the inclined side sections 100 serve to hasten the gravitational fall of the drippings through the slots, so that the drippings cannot collect on the baffle means and become charred and give off any burning odors which would have a deleterious effect on the cooking foodstuff on the grill 92. The drippings from the cooking foodstuffs on the grill 92, which fall through the slots 86 and 88 are collected in trays 102 and 104, the trays being identically constructed and disposed alongside the housing 48 and alongside and below the combustion chamber 66. The open top, elongated drippage collection trays 102 and 104 are slidably disposed on the top of the supporting wall 46 and are slidably movable within upstanding guide rails 106 formed on the upper surface of the wall 46, as shown in FIGURE 4. The drippage collection trays 102 and 104 are slidably removable and insertable through the opening 76 in the end wall 18 of the frame. For this purpose, the same are provided with handles (not shown), similar to the handle 74 for the combustion chamber 66.

The opening 76 is adapted to be closed off by a cover 108, which is secured by a piano-type hinge 110 to the wall 18 and is provided at its free end with a rotatable latch means 112, as shown in FIGURE 5.

An oven enclosure 114 is provided and is carried by the frame 12 in a manner so that it encloses the grill means 90. The oven enclosure 114 is composed of a straight, vertical back wall 116, opposing end walls 118 and a horizontal top wall 120, which is spaced well above the grill means 92, as shown in FIGURE 4. The oven enclosure 114 further includes a slightly upstanding front wall 122, to which the lower end edge of an oven door 124 is hingedly secured, as by means of a piano-hinge 126, as shown in FIGURES 3 and 4. The door 124 is inclined or sloped inwardly and upwardly and is provided with rotatable latches 128, adjacent its upper end edge, which lockingly engage the depending, downwardly and outwardly inclined terminal flange 130 on the top wall 120, as shown in FIGURE 4. The oven door 124 is sloped inwardly in order to retain condensation inside the oven interior or chamber.

The top wall 120 is formed with a forwardly projecting lip 132, which overhangs the door and is provided to prevent moisture from entering the oven door at its juncture with the flange 130.

One of the end walls 118 of the oven is provided with an air vent means 134, as shown in FIGURE 2, whereby the interior or chamber of the oven can be vented to the atmosphere. The air vent means 134 comprises an aperture or slot 136 formed in the wall and adapted to be completely or selectively partially closed off by a damper or slide plate 138, which is slidably disposed in guide rails 140 formed on the exterior of the wall 118, the plate having a handle means 142, whereby it may be slidably moved in the rails so as to control the venting of the interior or chamber of the oven to the atmosphere.

A handle 144 is provided on the end wall 18, above the door or cover 108 and is of substantially U-shaped configuration, so that the bight portion thereof can be manually grasped and the legs 24 can be lifted out of ground engagement and the machine 10 can be moved from place to place by virtue of the ground engaging wheels 28.

It can readily be appreciated that, in use, the cover 108 is opened and the combustion chamber is moved outwardly so as to place wood shavings or particles or other organic materials therein and then the combustion chamber is slid back into its normal position, with the trays 102 and 104 being in their normal position and the cover 108 is locked in its closed position, as shown in FIG- URE 5. The electric heating element 52 is then energized and the wood particles are heated so as to be transformed into charcoal. At this point, the oven door 124 is opened and the foodstuffs, such as meats, are placed on the grill 92 and the door 124 is locked closed. The foodstuffs are then cooked and flavored by the burning charcoal, with the heating means still being operative. The drippings from the foodstuffs are collected in the drippage collection trays 102 and 104 and the cooking temperature can be controlled by the heat control means 56 and also the cooking conditions can be controlled by virtue of the air vent means 134.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A barbecue machine comprising a generally horizontally disposed frame, a combustion chamber disposed in a horizontal position on said frame and adapted to contain wood particles or the like, electric heating means disposed on said frame and underlying the combustion chamber and operative to effect combustion of the wood particles and to transform the same into charcoal and then to burn the charcoal, grill means mounted on the frame in a generally horizontal position, and overlying the combustion chamber and on which foodstuffs are adapted to be placed so as to be cooked and flavored by the heat and smoke from the burning charcoal in the combustion chamber, and baffle means interposed between the combustion chamber and the grill means and having an imperforate section directly and completely overlying the combustion chamber to prevent drippings from the cooking foodstuffs from coming into contact with the combustion chamber, said baffle means having perforate sections interiorly adjoining the imperforate section so as to permit the fumes from the burning charcoal to pass upwardly into contact with the foodstuffs on the grill means and further to prevent foodstuff drippings from collecting in said baffle, said frame is elongated and includes opposing longitudinal side walls and opposing transverse end walls, a substantially flat horizontal supporting wall secured between said side and end walls, a housing upstanding from the supporting wall and extending longitudinally thereof, said electric heating means including an electric heating element mounted in said housing and means for positioning the combustion chamber on top of the housing for the electric heating element, said combustion chamber is in the form of an elongated open top tray, said mounting means for the combustion chamber including guide rails provided on the top of the electric heating element housing and extending longitudinally thereof in transversely spaced relation and said combustion chamber tray having a bottom wall slidably engaging and supported by the top wall of the electric heating element housing and having side walls slidably engaged at their lower edges by the guide rails, one of the end walls of the frame having an opening through which the combustion chamber tray can be moved to remove and insert the combustion chamber tray in position.

2. The invention of claim 1, wherein said housing is disposed substantially centrally of the supporting wall and guide rail means are provided on opposite sides thereof and open top trays slidably disposed in said guide rail means and positionable alongside and slightly below the combustion chamber tray to collect the drippings from the cooking foodstuffs on the grill means, said drippage collection trays being removable through said opening in the said one end wall of the frame.

3. The invention of claim 2, wherein a cover means is hingedly carried by the said one end wall of the frame to close off said opening therein.

4. The invention of claim 3, wherein said baffle means includes a plate carried by the frame and disposed in a generally horizontal position between the side and end walls of the frame and said perforate sections thereof are constituted by elongated slots overlying the drippage collection trays.

5. The invention of claim 4, wherein said baffle plate has a substantially flat bottom wall formed with said slots and a top wall, said top wall including a triangular center section disposed above the combustion chamber and having its apex underlying the grill means and its sides sloped downwardly and outwardly towards the slots so as to direct the falling drippings from the grill means toward and into the slots and said top wall having inwardly and downwardly sloped side sections which direct the falling drippings toward and into the slots so that the drippings are prevented from collecting as they fall from the grill means onto the baffle plate.

6. The invention of claim 5, wherein said grill means is removably mounted on the frame.

7. The invention of claim 5, wherein said grill means includes a substantially flat rectangular grill having depending side and end flanges and said side and end walls of the frame have upper edges on which said side and end flanges are removably seated.

8. The invention of claim 7 wherein an oven enclosure is mounted on the frame and upstands therefrom and encloses the grill means.

9. The invention of claim 8 wherein said oven enclosure has an upwardly and inwardly inclined front wall having an opening providing access to the grill and a door hingedly and lockingly carried by the front wall for closing off said opening.

10. The invention of claim 9 wherein said oven is provided with a wall having an adjustable air vent means.

11. The invention of claim 10, wherein said oven has a top wall having a horizontally projecting lip overlying the door.

12. A barbecue machine comprising a generally horizontally disposed frame, a combustion chamber disposed in a horizontal position on said frame and adapted to contain wood particles or the like, electric heating means disposed on said frame and underlying the combustion chamber and operative to effect combustion of the wood particles and to transform the same into charcoal and then to burn the charcoal, grill means mounted on the frame in a generally horizontal position, and overlying the combustion chamber and on which foodstuffs are adapted to be placed so as to be cooked and flavored by the heat and smoke from the burning charcoal in the combustion chamber, and baffle means interposed between the combustion chamber and the grill means and having an imperforate section directly and completely overlying the combustion chamber to prevent drippings from the cooking foodstuffs from coming into contact with the combustion chamber, said baffle means having perforate sections interiorly adjoining the imperforate section so as to permit the fumes from the burning charcoal to pass upwardly into contact with the foodstuffs on the grill means and further to prevent foodstuff drippings from collecting in said baffle means, and independent and distinct means for internally collecting said drippings, said frame including a longitudinally disposed housing supported thereon, said electric heating means including an electric heating element mounted in said housing, said combustion chamber being in the form of an elongated open top tray, guide rails mounted on said housing and extending longitudinally thereof in transversely spaced relation, said open top tray having a bottom wall slidably engaging the top of said housing, said guide rails engaging said tray for slidably guiding the movement of the tray to enable removal and insertion of the combustion chamber tray, said means for collecting drippings including open top trays supported by the frame in generally parallel relation and on opposite side-by-side relation to the combustion chamber tray.

References Cited

UNITED STATES PATENTS

| | | | |
|---|---|---|---|
| 2,881,695 | 4/1959 | Di Pietro | 99—446 |
| 2,943,557 | 7/1960 | Suehlsen | 99—446 |
| 1,057,449 | 4/1913 | Noreck | 99—446 |
| 1,159,890 | 11/1915 | Best et al. | 99—446 |
| 355,706 | 1/1887 | Murphy | 99—259 |
| 739,214 | 9/1903 | Phillips | 99—446 |
| 2,763,200 | 9/1956 | Kittler | 99—425 X |
| 2,789,877 | 4/1957 | Pfundt | 99—259 X |
| 2,796,019 | 6/1957 | Vaughn | 126—59.5 X |
| 2,833,201 | 5/1958 | Simank | 99—259 |
| 2,842,043 | 7/1958 | Reuland | 99—259 |
| 2,894,448 | 7/1959 | Henderson et al. | 99—259 X |
| 3,040,651 | 7/1962 | Nolte | 99—446 |
| 3,130,662 | 4/1964 | Robinson | 99—446 X |
| 3,209,743 | 10/1965 | Stewart et al. | 126—25 |

FOREIGN PATENTS 271,879  3/1914  Germany.

WALTER A. SCHEEL, *Primary Examiner.*

J. M. NEARY, *Assistant Examiner.*